United States Patent

[11] 3,584,602

| [72] | Inventor | Robert Stasio<br>Brooklyn, N.Y. |
|---|---|---|
| [21] | Appl. No. | 831,635 |
| [22] | Filed | June 9, 1969 |
| [45] | Patented | June 15, 1971 |
| [73] | Assignee | Halvin Products Company, Inc.<br>Brooklyn, N.Y. |

[54] AQUARIUM FISH HATCHERY DEVICE
6 Claims, 4 Drawing Figs.

[52] U.S. Cl. .................................................. 119/5,
119/3
[51] Int. Cl. ....................................................... A01k 63/00
[50] Field of Search ........................................ 119/3, 5, 2;
210/169

[56] References Cited
UNITED STATES PATENTS

| 3,121,417 | 2/1964 | Goldman et al. | 119/5 |
| 3,140,691 | 7/1964 | Stark | 119/5 |
| 3,216,395 | 11/1965 | Girard | 119/3 X |
| 3,261,471 | 7/1966 | Halpert | 210/169 |
| 3,321,081 | 5/1967 | Willinger | 210/169 |
| 3,485,373 | 12/1969 | Powers | 210/169 |

Primary Examiner—Aldrich F. Medbery
Attorney—Carl Miller

ABSTRACT: A fish hatching device consisting of a main tank removably supporting a confining mother fish containing housing including a lower auxiliary housing for hatched fish, the two housings being separated by a removable grid and openings in the upper mother fish containing housing for permitting a flow of water thereinto from the main tank. Supported exteriorly of the main tank is a flow and aerating tank divided into two compartments by a removable partition having a screened opening. Water is drawn from the lower end of the auxiliary tank into one compartment and flows through the screen into the other compartment from which the water is returned to the main tank, the water being aerated by means of an electric air pump, the cycle being repeated as long as necessary. The removable grid supports the eggs laid by the mother fish and the auxiliary housing contains the hatched fish. Later the same may be transferred to the main tank when attaining sufficient growth.

PATENTED JUN 15 1971 3,584,602
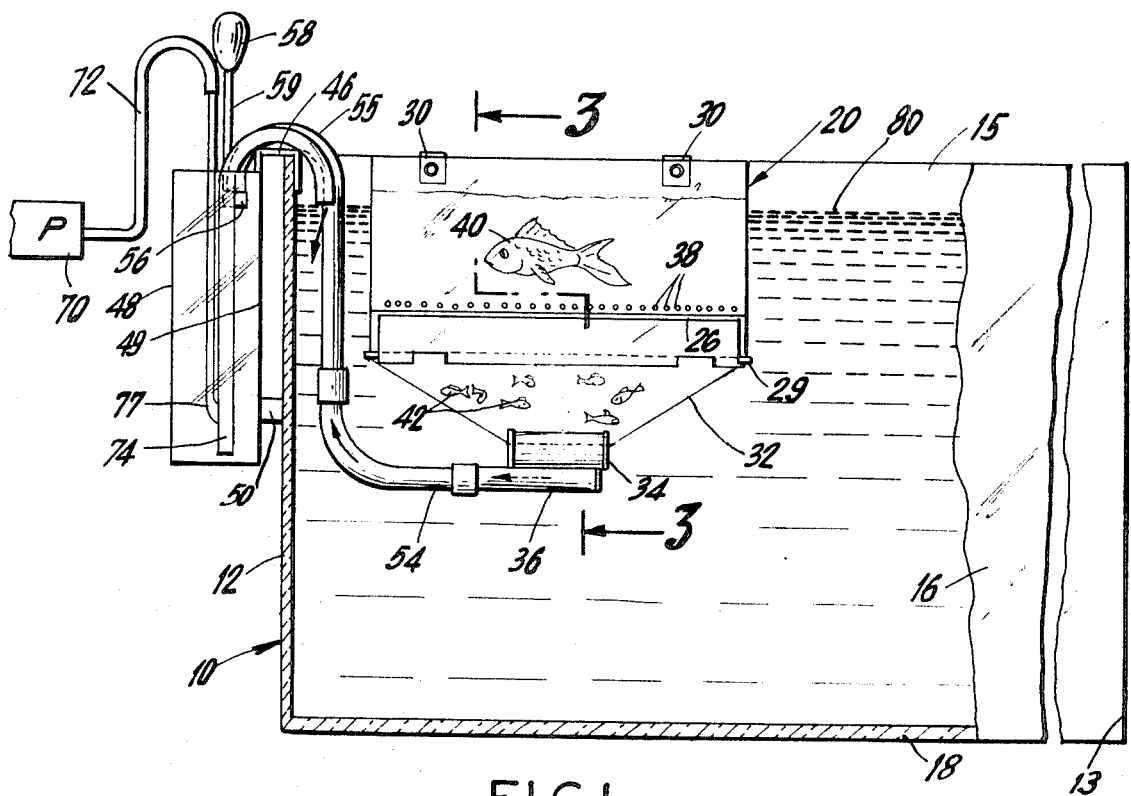
FIG.1
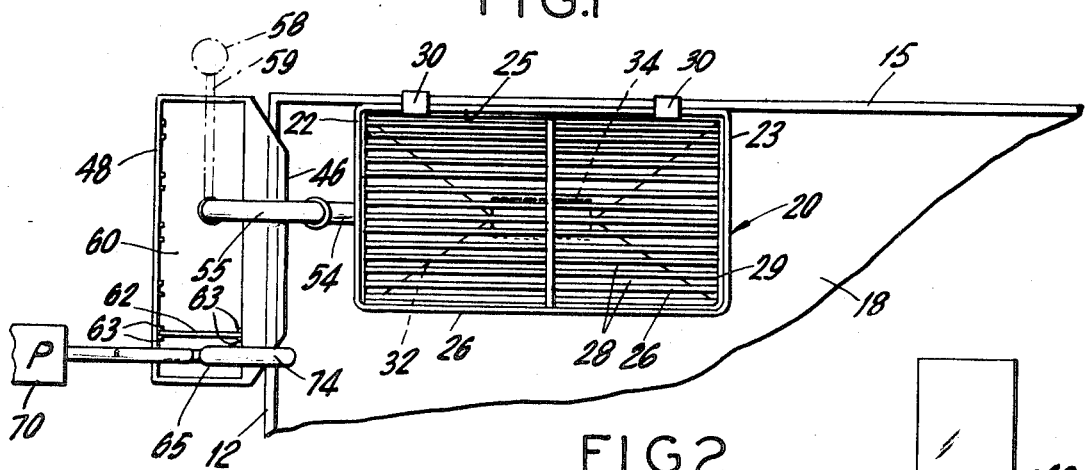
FIG.2
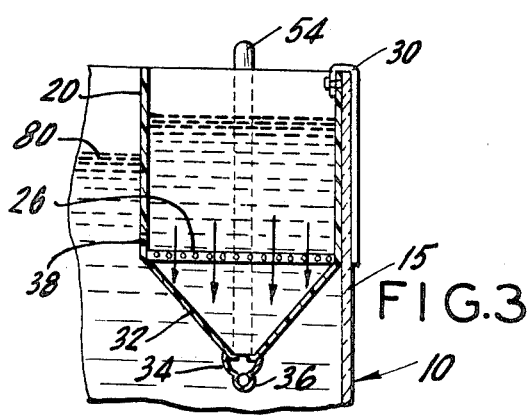
FIG.3
FIG.4
INVENTOR.
ROBERT STASIO
BY
Carl Miller
ATTORNEY 3,584,602

1

AQUARIUM FISH HATCHERY DEVICE

This invention relates to a fish hatchery device suitable for home or aquarium use.

The primary object of this invention is to provide within a main tank, a separate mother-fish containing housing having at its lower end an auxiliary housing of smaller volume, the upper housing containing the mother fish and the auxiliary housing containing the hatched fish.

Another object of this invention relates to the provision of a removable grid separating the two housings and supported at the bottom of the mother-fish containing housing, the grid being adapted to support the eggs laid by the mother fish.

Yet another object of this invention is to provide openings in at least one wall of the mother-fish containing housing to permit the flow of water from the main tank into the mother-fish containing housing.

A further object of this invention relates to the provision of a water flow and aerating tank removably supported on the main tank exteriorly thereof including a removable partition dividing the water flow and aerating tank into two compartments.

Still another object of this invention is to provide the removable partition with an enlarged screened opening to hold back debris and other matter.

Another object of this invention relates to providing a water discharge conduit connected to the lower end of the auxiliary hatched fish housing and arranged to discharge the water into a compartment of the flow and aerating tank, including a syphon bulb unit for initiating the flow of water into said compartment.

Still another object of the invention is to discharge by means of a conduit the clean and clear water in the other compartment of the flow and aerating tank that has passed through the screen back into the main tank utilizing in conjunction with the conduit a stream of air supplied by a pipe from an air pump, to establish the return flow of water as well as aerating the same.

Further objects of the invention will appear as the description proceeds.

To the accomplishment of the above and related objects, my invention may embodied in the form illustrated in the accompanying drawings, attention being called to the fact, however, that the drawings are illustrative only, and that change may be made in the specific construction illustrated and described within the scope of the appended claims.

In the drawings:

FIG. 1 is a vertical cross-sectional view partly in elevation of the fish hatchery device.

FIG. 2 is a partial plan view of mother-fish containing housing with grid and associated flow and aerating tank.

FIG. 3 is a detail cross-sectional view taken on line 3-3, FIG. 1.

FIG. 4 is an elevational view of the removable portion showing the screened opening therein.

Referring in greater detail to the drawings a tank 10 is formed of glass transparent plastic or any other suitable material and is shown to be of rectangular box shaped construction open at its top and provided with end sidewall 12, 13; longitudinal sidewalls 15, 16 and a bottom wall 18. Mounted on wall 15 is a fish containing housing 20 preferably rectangular in shape having end sidewalls 22, 23 and longitudinal sidewalls 25, 26. The fish containing housing 20 may also be formed of glass or a transparent plastic material. Suitable mounted at the bottom of the housing 20, which is open, it a grid 26 made up of closely spaced connected rods 28, the grid 26 being removably supported on a suitable ledge or lugs 29. Brackets 30 secured on wall 25 of the housing serve to suspend the fish containing housing 20 from the top edge of tank wall 15. Also removably suspended from the open bottom of the housing 20 is an auxiliary fish containing housing 32 being also formed of glass or transparent plastic and which in effect forms a closure for the open bottom of the housing 20, as seen in FIGS. 1 and 2.

Formed integral with the bottom of the auxiliary fish housing 32 is closed water chamber 34 having an opening into housing 32 which serves as its top wall. At the bottom wall of chamber 34 there is provided a water discharge conduit 36.

Provided in at least one of the wall of the fish containing housing 20 adjacent the grid 26 is a row of openings 38 which permit a flow of water from the tank 10 into the housing 20, the water also filling the auxiliary housing 32, and water chamber 34. The housing 20 is of a size sufficient to contain a mother fish 40. The eggs deposited by the mother fish are supported on the grid 26 and the infant fish 42 when hatched move downwardly from the grid into the auxiliary housing 32.

The water which may be of any desired temperature through the medium of a heater device (not shown), if such be desired, is circulated downwardly through housing 20 and auxiliary housing 32 and is also aerated for a purpose and in the manner as will be hereinafter described.

Suspended by means of a bracket 46 on end sidewall 12 of tank 10 is a water flow and aerating tank 48, the bracket 46 being as seen in FIG. 2 integral with the top portion of wall 49 of the flow and aerating tank 48. The wall 49 which is the inner wall of tank 48 carries at its lower end a spacer lug 50 which may be an integral part of the tank wall 49 or it may be formed of rubber or any other suitable material and secured to the tank wall 49 in any suitable manner. The spacer lug 50 serves to firmly hold the tank 48 in a vertical position and in spaced parallel relation to tank end wall 12, see FIG. 1. The flow and aerating tank 48 may be of glass, transparent plastic or any other suitable material and is removably mounted on the tank end wall 12.

Connected to water discharge conduit 36 is one end of discharge pipe 54, the other end of pipe 54 being bent downward as at 55 to overhang bracket 46 with its terminal end 56 open and located within the upper portion of flow and aerating tank 48, see FIG. 1. A syphon bulb 58 with tube 59 is suitable connected to discharge pipe 55 to establish a flow of water from housings 20 and 32 into compartment 60 of flow and aerating tank 48. A removable wall or partition 62 slidable between spaced opposed guide lugs 63 provides on one side thereof in tank 48 the compartment 60 and on the other side thereof a compartment 65. The partition 62 may be placed in selected positions within tank 48 to vary the relative size of compartments 60 and 65. Provided substantially centrally in partition 62 is an enlarged opening 67 that is covered by a fine mesh screen 68.

An electric operated air pump 70 discharges a steady stream of air through pipe 72 into a water return conduit 74, the lower end of which is open and lies in close spaced relation to the bottom wall 75 of the flow and aerating tank 48, see FIG. 1. Air supply pipe 72 at its lower end 77 is connected to the lower end portion of water return conduit 74. The upper end of water return conduit 74 is arcuately bent at its upper end to overhang bracket 46 with its open terminal end near the top of the tank 10 and adapted to be at or extend slightly below the water level 80 therein.

From the above construction it is seen that a constant gentle flow of water from tank 10 passes into fish containing housing 20, past the eggs on grid 26 into auxiliary housing 32 containing the minute hatched fish 42 out through an opening water chamber 34, water discharge conduits 36, 54 into compartment 60 of the flow and aerating tank 48, the flow of water thereinto being initially started by the syphon bulb 58. The water which fills compartment 60 passes through screen 68 extending over opening 67 in partition 62, the screen holding back any debris, food particles, etc. that may be in the water. Thus, only clear, clean water enters compartment 65. The stream of air coming from air pump 70 flows through air pipe 72 into water return conduit 74 causing water in compartment 65 to flow upwardly in air pipe 72 wherein it is aerated at the same time for discharge into main tank 10, this cycle of operating being continued for as long as deemed necessary. It is seen that the water in the main tank and associated separate housings is not unduly agitated to disturb the eggs and that the mother fish, the eggs and hatched fish are treated to a mild flow of clean, aerated water for as long as necessary.

When the eggs are layed or when the baby fish are born these pass through the grid 26 to auxiliary housing 32 into water chamber 34 and then drop to water discharge conduit 36 and into discharge pipe 54, then through bent pipe 55 and to exit at terminal end 56 and then into aerating tank 48, to be stored therein until to be manually removed from said aerating tank 48. Thus it will be seen, that the eggs or baby fish are immediately separated from the mother fish, so as to prevent the mother fish from consuming the eggs or baby fish.

What I claim is:

1. A fish hatchery device comprising:
 a. a main tank having end and sidewalls, a bottom and open at its top,
 b. a mother-fish containing housing,
 c. bracket means secured to said fish containing housing for supporting the same within said main tank from the edge of one sidewall thereof,
 d. an auxiliary housing having downwardly tapering walls providing a discharge opening at the lower end of said auxiliary housing,
 e. said fish containing housing at its bottom and said auxiliary housing at its top being open, complemental in shape and having areas substantially equal to each other, the auxiliary housing constituting a closure for said mother-fish containing housing.
 f. said auxiliary housing being removably suspended from said fish containing housing from the bottom thereof,
 g. support means interiorly of said fish containing housing at the bottom thereof,
 h. a removable mother-fish retaining grid extending across the bottom of said fish containing housing seated on said support means, and
 i. there being a plurality of openings in the fish containing housing above said grid for the flow of water into said housing from said main tank.

2. The fish hatchery of claim 1 including:
 a. a water flow and aerating tank mounted on said main tank exteriorly thereof,
 b. a partition dividing said water flow and aerating tank into a water receiving compartment and a water discharge compartment,
 c. there being a single large centrally positioned opening in said partition for permitting a free unrestricted flow of water from the water receiving compartment into the water discharge compartment,
 d. first conduit means connected to the discharge opening of the auxiliary housing for conducting water from the auxiliary housing to the water receiving compartment of the water flow and aerating tank, and
 e. second conduit means including aerating means for delivery of water from the water discharge compartment of the water flow and aerating tank to the main tank.

3. The fish hatchery device of claim 2 including:
 a. a syphon bulb means associated with the first conduit means to initiate the flow of water into the water receiving compartment,
 b. bracket means secured to one wall of the water flow and aerating tank for mounting said tank exteriorly on one end wall of the main tank, and
 c. spacer lug means secured exteriorly to said one wall of the water flow and aerating tank engageable with said one end wall of the main tank supporting the same whereby to maintain the water flow and aerating tank vertical.

4. The fish hatchery device of claim 3, wherein said first conduit means comprises
 a. a water receiving chamber mounted at the lower end of said auxiliary chamber receiving water through the discharge opening thereof,
 b. a water discharge conduit having one end connected to said water receiving chamber and extending upwardly within said main tank, and
 c. the upper end portion of said water discharge conduit being arcuately bent to extend over said one end wall of the main tank and with its lower open end positioned in the upper portion of the water receiving compartment of said water flow and aerating tank.

5. The fish hatchery device of claim 4, including:
 a. a screen extending over the opening in the partition,
 b. opposed pairs of vertical guide lugs longitudinally spaced on the inner surfaces of opposed walls of said water flow and aerating tank, and
 c. said partition being removable for positioning in a selected opposed pair of guide lugs in said water flow and aerating tank whereby to vary the size of said water receiving and water discharge compartments.

6. The fish hatchery device of claim 5 wherein said second conduit means comprises:
 a. a pipe in the water discharge compartment of said water flow and aerating tank having its lower open end disposed close to the bottom of said compartment and its upper end arcuately bent to extend over said one end wall of the main tank with its upper open terminal end disposed substantially at the water level in said main tank,
 b. an electric operated air pump having an air discharge pipe connected thereto,
 c. said air discharge pipe extending into the water discharge compartment of said water flow and aerating tank and connected at its lower end to the lower end of said pipe, whereby, to establish flow of water from the water discharge compartment up through said pipe for return to said main tank, the water flowing in said pipe being aerated by the air stream emanating from said air discharge pipe.